(12) United States Patent
Pratt

(10) Patent No.: US 10,412,381 B1
(45) Date of Patent: Sep. 10, 2019

(54) CALIBRATION TARGET FOR IMAGE SENSOR

(71) Applicant: Patricia D. Pratt, Redondo Beach, CA (US)

(72) Inventor: Patricia D. Pratt, Redondo Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 378 days.

(21) Appl. No.: 15/359,331

(22) Filed: Nov. 22, 2016

(51) Int. Cl.
*H04N 5/44* (2011.01)
*H04N 17/00* (2006.01)
*H04N 7/18* (2006.01)
*G03B 15/00* (2006.01)
*G03B 43/00* (2006.01)
*B64D 47/08* (2006.01)
*B64G 1/66* (2006.01)

(52) U.S. Cl.
CPC ........... *H04N 17/002* (2013.01); *B64D 47/08* (2013.01); *B64G 1/66* (2013.01); *G03B 15/006* (2013.01); *G03B 43/00* (2013.01); *H04N 5/44* (2013.01); *H04N 7/185* (2013.01)

(58) Field of Classification Search
CPC ........ H04N 17/002; H04N 5/44; H04N 7/185; B64D 47/08; B64G 1/66; G03B 15/006; G03B 43/00
USPC ......................................................... 348/144
See application file for complete search history.

(56) References Cited

U.S. PATENT DOCUMENTS

| | | | | |
|---|---|---|---|---|
| 5,069,109 A | * | 12/1991 | Lavan, Jr. ................ | B63G 9/04 114/240 C |
| 10,165,264 B1 | * | 12/2018 | Pratt .................... | H04N 17/002 |
| 2002/0070341 A1 | * | 6/2002 | Toomey .................. | G01M 3/38 250/341.1 |
| 2008/0024608 A1 | * | 1/2008 | Hahn ........................ | B60R 1/00 348/148 |
| 2018/0122061 A1 | * | 5/2018 | Chatterjee ................. | G06T 7/90 |

\* cited by examiner

*Primary Examiner* — William C Vaughn, Jr.
*Assistant Examiner* — Jae N Noh
(74) *Attorney, Agent, or Firm* — Tarolli, Sundheim, Covell & Tummino LLP

(57) ABSTRACT

A calibration target for an image sensor can include a plurality of bulbs that each emit light at one or more predetermined wavelengths. The calibration target can also include a container circumscribing the plurality of bulbs. The plurality of bulbs can be stacked and scattered within a volume partially or fully enclosed by the container, and the container has an open top that defines an area for the calibration target. Additionally, the image sensor can be deployed on an aircraft or a satellite.

19 Claims, 5 Drawing Sheets

CALIBRATION TARGET FOR IMAGE SENSOR

TECHNICAL FIELD

The present invention relates generally to calibration of on board sensors of airborne vehicles, and more particularly to a calibration target that includes bulbs that emit light.

BACKGROUND

Meteorological satellites operating in geostationary orbits around the Earth provide observations of the Earth's surface and clouds. Images in or near the visible spectral domain can be used for the weather forecast and for monitoring important climate variables such as the surface insolation, surface albedo, pollution, smog and cloud characteristics. In some examples, such meteorological satellites can employ hyperspectral imaging.

Calibrating imagers is a common pre-processing step for remote sensing analysts that need to extract data and create scientific products from images. Calibration attempts to compensate for radiometric errors from sensor defects, variations in scan angle, and system noise to produce an image that represents true spectral radiance at the sensor.

SUMMARY

In one example, a calibration target for an image sensor can include a plurality of bulbs that each emit light at one or more predetermined wavelengths. The calibration target can also include a container circumscribing the plurality of bulbs. The plurality of bulbs can be stacked and scattered within a volume partially or fully enclosed by the container, and the container has an open top that defines an area of the calibration target. Additionally, the image sensor can be deployed on an aircraft or a satellite.

In another example, a calibration target for an image sensor can include a plurality of buoyant bulbs. Each of the plurality of buoyant bulbs can include a plurality of light emitting devices and an antenna that receives wireless signals communicated from a remote controller. Each of the plurality of buoyant bulbs can also include a controller configured to control an output of the light emitting device based on the wireless signals received from the remote controller. The calibration target can also include a seine net circumscribing the plurality of buoyant bulbs. The calibration target can be deployed in a body of water, and the image sensor can deployed on one of an aircraft and a satellite.

In yet another example, a calibration target for an image sensor can include a seine net circumscribing an area in a body of water. The calibration target can also include a plurality of bulbs that each emit light at one or more predetermined wavelengths. The plurality of bulbs can be stacked and scattered within a volume partially or fully enclosed by the container, and at least two of the plurality of bulbs emit different color light.

DETAILED DESCRIPTION

This disclosure relates to an approach for calibrating (visible) multispectral and/or hyperspectral imagery devices (on-board optical sensors) of airborne vehicles and/or satellites for imaging errors using an in-situ illuminated water floating light calibration target or a terrestrial calibration target. The in-situ illuminated water floating calibration target includes a buoyant seine net (a water deployable net) having a purse in which a plurality of spherical light-emitting bulbs can be suspended. The spherical light-emitting balls can be stacked and layered to form a plurality of light-emitting bulbs. Each of the spherical light-emitting bulbs (or some subset thereof) can be remotely configured to illuminate simultaneously a particular color or different colors (e.g., red, green, blue, etc.) to provide an illuminated area that can be used as a light source for calibrating the image sensor.

Airborne vehicles and/or satellites can be configured to fly-over the water-illuminated area such that pixels of the multispectral and hyperspectral imagery devices can be calibrated to reduce the imaging errors in such imaging devices. In some examples, a bottom portion of the seine net could be filled with white or reflective components to direct light illuminated by the plurality of spherical light-emitting balls in a substantially up-ward direction.

In some examples, multiple instances of the seine nets filled with the light emitting bulbs can be positioned (or stringed) together to form a lighted area sufficiently needed to perform Modulation Transfer Function (MTF) commonly used in satellite calibration. In the present examples described herein, the term "bright light" denotes light on nearly any part of the EM spectrum.

Figure 1:
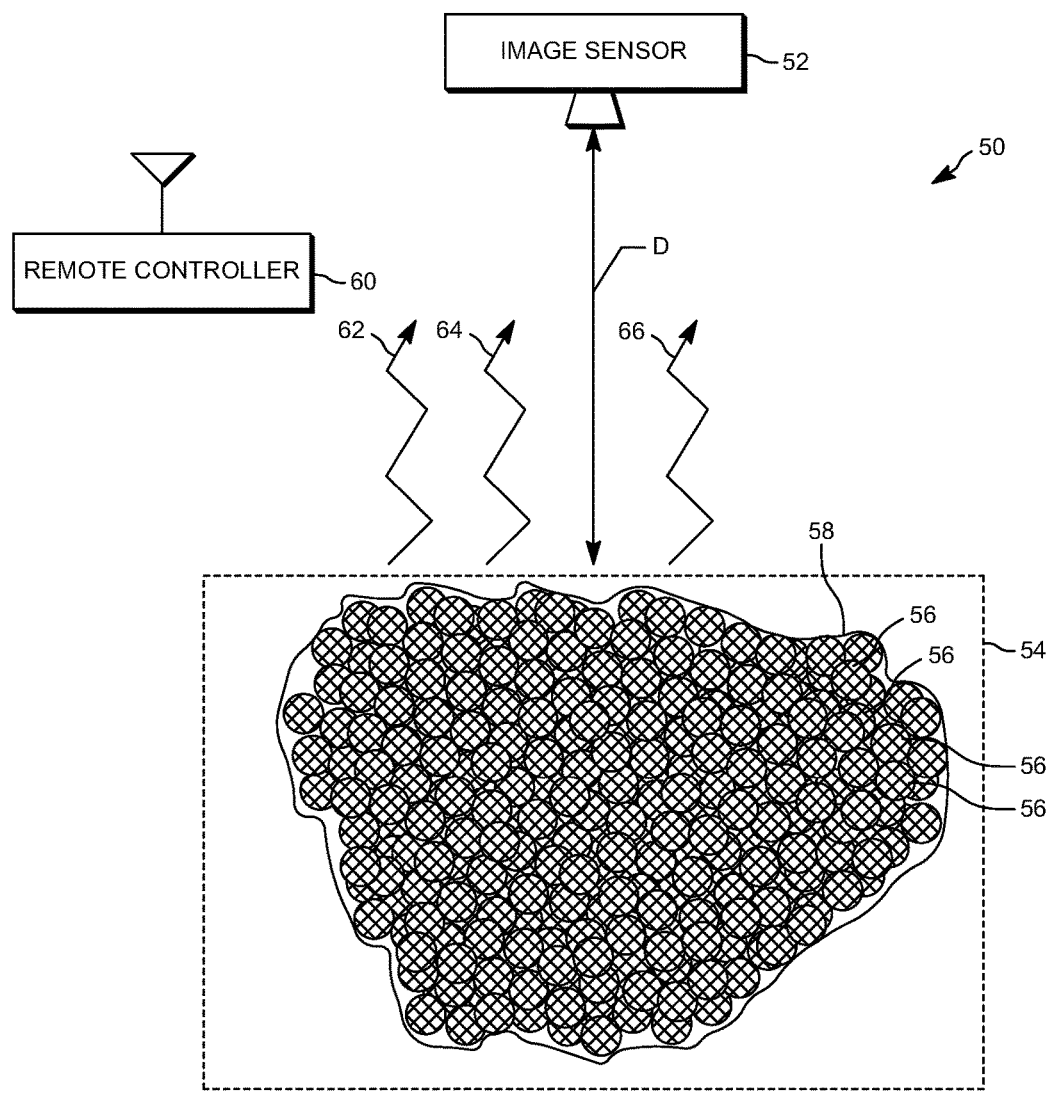
FIG. 1 illustrates an example of a system for calibrating an image sensor.

FIG. 1 illustrates an example of a system 50 for calibrating an image sensor 52. The image sensor 52 can be an airborne imager. For instance, the image sensor 52 can be deployed on an aircraft or a satellite. The image sensor 52 can be a multispectral image sensor or a hyperspectral image sensor. As used herein, the term multispectral denotes a plurality of discrete bands in the electromagnetic (EM) wave spectrum. In such a situation, the image sensor 52 can be configured to receive EM waves in 3 or more bands (e.g., corresponding to red, blue and green). Alternatively, the image sensor 52 can be implemented as a hyperspectral image sensor and can be configured to receive EM waves in 100 bands or more (e.g., 300 bands or more). Additionally, as used herein, the term "hyperspectral" denotes a plurality of continuous bands in the EM wave spectrum, wherein each of the bands have a bandwidth of about 15 nanometers (nm) or less (e.g., 3 nm to 15 nm).

The image sensor 52 can be configured to capture images of a given area. As noted, the image sensor 52 is airborne, such that the given area can be a specific geographic area of the Earth. The specific geographic area can include land or water.

Due to environmental variables (e.g., change of temperature, vibrations, etc.), the image sensor 52 may need calibration on a periodic and/or as-needed (e.g., ad-hoc) basis. In such a situation, the image sensor 52 can be configured to capture an image of a calibration target 54. The calibration target 54 can have a predetermined size, color and functional characteristics that can be relied upon by the image sensor 52 to facilitate calibration. In some examples, the calibration target 54 can be relatively buoyant for deployment in a body of water. Additionally, in some examples, the calibration target 54 can have a slightly negative buoyancy to allow the light provided by the calibration target 54 to first travel through a lens of water for measuring the signal after the water has absorbed and scattered the light thus allowing for characterizing the properties of the water. Alternatively, in other examples, the calibration target 54 can be deployed in a terrestrial environment.

The calibration target 54 include K number of bulbs 56 disposed within a container 58 (a partial enclosure), where K is an integer greater than or equal to two. For purposes of simplification of explanation, only four of the K number of bulbs 56 are labeled in FIG. 1. Each of the K number of bulbs 56 can have a spherical shape and can emit light at a predetermined wavelength (color).

Figure 2:
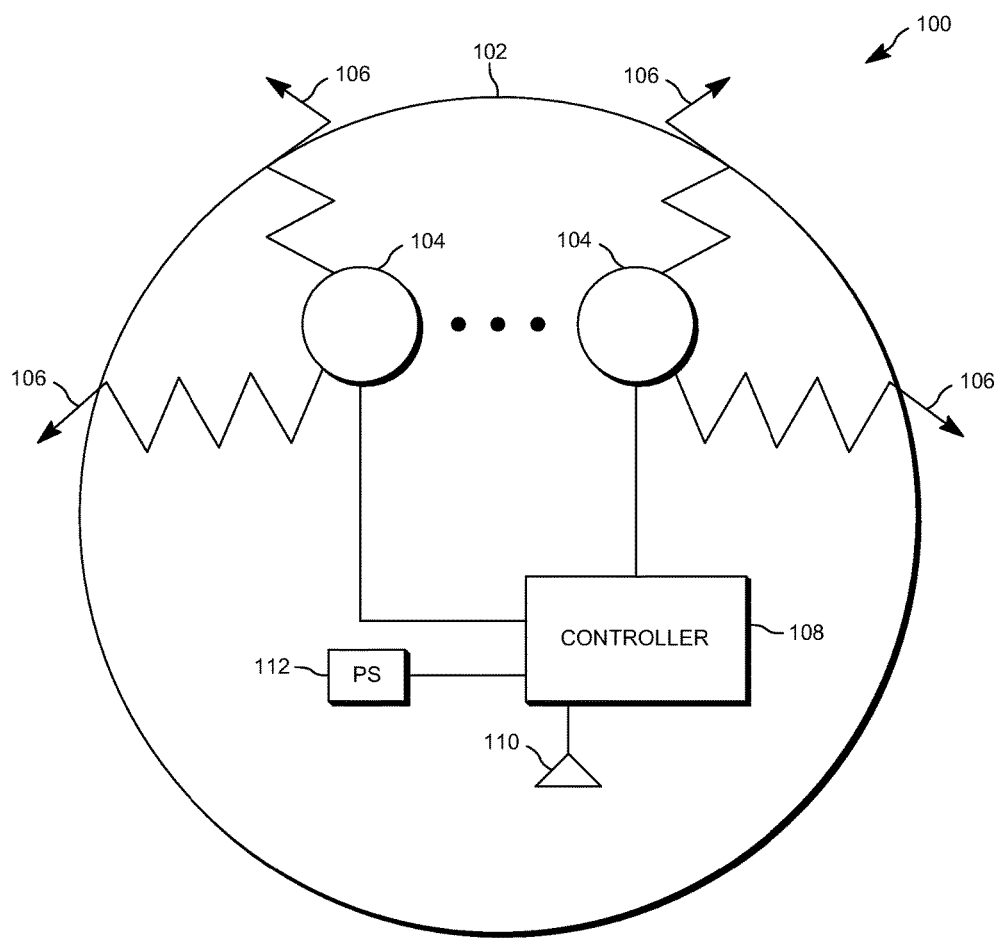
FIG. 2 illustrates an example of a bulb for a calibration target for an image sensor.

FIG. 2 illustrates a detailed example of a bulb 100 that could be employed to implement one of the K number of bulbs 56 illustrated in FIG. 1. In examples where the bulb 100 is deployed in water, the bulb 100 can be buoyant. The bulb 100 can have a casing 102. The casing 102 can be formed from a rigid, transparent or translucent material, such as glass or plastic. The casing 102 can be waterproof, and can have a spherical shape. The casing 102 can house components of the bulb 100. In particular, the bulb 100 can include N number of light sources 104, where N is an integer greater than or equal to one. The N number of light sources 104 can emit light, represented as arrows 106 that can penetrate the casing 102. In some examples, the each of the N number of light sources 104 (or some subset thereof) can emit a different color. In other examples, each of the N number of light sources 104 can emit the same color. Each of the light sources 104 can be, for example, a light emitting diode (LED). In such a situation, each of the light sources 104 (LEDs) can be configured to emit light at varying power levels in one or more predetermined bands.

The N number of light sources 104 can be controlled by a controller 108. The controller 108 can be, for example, a microcontroller. The controller 108 can control the intensity of the light emitted by the N number of light sources 104. Additionally, in examples where different light sources 104 emit different colors, the controller 108 can control which light sources 104 output light, thereby controlling the color of light output by the bulb 100.

The controller 108 can include a wireless interface coupled to an antenna 110 that communicates with an external device (e.g., a computing device). The controller 108 can receive commands from the external device via the wireless interface that causes the controller 108 to control the output of the N number of light sources 104.

The controller 108 can include a power source 112 that provides power to the controller 108. The power source 112 can be, for example a battery, a photo-voltaic cell, etc. In some examples, the casing 102 can be designed to allow access to the power supply 112 (e.g., to replace the battery).

Referring back to FIG. 1, the K number of bulbs 56 can be scattered within the container 58 (shown as a partial enclosure, yet could be enclosed and suspended, towed or floating in the area of interest). The container 58 could be, for example, a seine net, such as in situations where the calibration target 54 is deployed in water. In situations where the calibration target 54 is deployed on land, the container 58 could be a cage or other structure to hold the K number of bulbs 56. In many examples, there can be hundreds or thousands of bulbs 56. Additionally, in some examples, there can be about 4 or more layers of bulbs 56. The number of layers of the bulbs 56 can be based, for example, on a size of the bulbs 56, the opacity of the bulbs 56 and/or a function of the K number of bulbs 56. That is, in situations where all (or nearly all) light beneath the calibration target 54 is to be blocked, there can be six (6) or more layers of bulbs 56. In situations where it is desirable that some light beneath the calibration target 54 penetrate a top surface of the calibration target 54 there may be only 4 layers (or less) of bulbs 56. Moreover, due to the random positioning of the K number of bulbs 56, different areas of the calibration target 54 may have different numbers of layers.

Each of the K number of bulbs 56 can output visible light rays with a specific radiance. In particular, the light waves output by the K number of bulbs 56 can be a single color or a mix of colors on a predetermined set of spectral bands (e.g., a single spectral band or a plurality of spectral bands). The light rays output by the K number of bulbs 56 are depicted in FIG. 1 as arrows 62, 64 and 66. The predetermined set of spectral bands can correspond to the spectral bands detectable by the image sensor 52.

A remote controller 60 (e.g., a computing device) can communicate with the K number of bulbs 56. The remote controller 60 can operate as the external computing device explained with respect to FIG. 2. The remote controller 60 provide signals to the controller local to each of the K number of bulbs 56 to control an emission of light by each of the K number of bulbs 56. Additionally, in some examples, the remote controller 70 can communicate with the image sensor 52 to initiate a calibration procedure.

The calibration target 54 can have a total area, $A_{Total}$ that is approximately equal to top an overhead (top) viewable area enveloped by the container 58. In operation, the calibration target 54 can simulate flares or other bright light arrays that are routinely implemented in image sensor calibration. In particular, the K number of bulbs 56 can be organized such that a bright source of light can be generated, particularly at night such that the image sensor 52 (e.g., deployed on a satellite) can measure radiance and execute the calibration procedure.

The calibration target 54 can generate light sufficient to saturate at least one pixel of the image sensor 52. For example, the calibration target 54 can be sized and/or illuminated in a manner that the image sensor 52 can capture a measurable quantity of light of at least 7.9 photons per every 91 meters (about 300 feet) of a distance "D" between the image sensor 52 and the calibration target 54 if the image sensor 52 is traveling at a high velocity (e.g., such as in a satellite moving at a rate of about 7000 m/s). In situations where the image sensor 52 is traveling slower, the image sensor 52 may be able to operate properly while capturing a higher number of photons per 91 meters of the distance D from the longer dwell time or lower altitude. Such illumination can be generated at the K number of bulbs 56 of the calibration target 54. Additionally, it is noted that in many examples, the calibration target 54 can generate light several orders of magnitude greater than the minimum needed to be detected by the image sensor 52.

In a situation where the image sensor 52 is mounted on an aircraft, each pixel of the image sensor 52 can correspond to an area size of at least 5 meters (m) by 5 meters. Accordingly, in such a situation, the calibration target 54 has a total area, $A_{Total}$ of at least about 25 square meters (m²) or more. In situations where the image sensor 52 is mounted on a satellite, each pixel of the image sensor 52 can correspond to an area size of at least 250 m by 250 m. Accordingly, the calibration target 54 can have a total area, $A_{Total}$ enveloped by the container 58 of at least about 62,500 m². As noted, the size of the calibration target 54 can be proportional to the predetermined approximate distance, D of separation between the image sensor 52 and the calibration target 54. That is, the larger the predetermined approximate distance, D of separation between the image sensor 52 and the calibration target 54, the larger the calibration target 54 may be.

Furthermore, in some examples, the calibration target 54 can include multiple instances of the container 58 (each with the K number of bulbs 56 deployed therein) that are arranged in an array (positioned and/or stringed together) to achieve a desired total area, $A_{Total}$ for the calibration target 54. As one an example, the container 58 can be implemented as a purse seine net that has a perimeter of about 1 km (1000 m) in length. In such a situation, the container 58 can form a circular shape (or approximately circular), such that the container 58 (a seine net) can circumscribe a circle with a diameter of about 318 m (0.318 km) and the container 58 can circumscribe and area of about 79,577 $m^2$ (0.079577 $km^2$). In this situation, forming an array of 4×4 such containers 58 can provide a total area total area, $A_{Total}$ for the calibration target 54 of about 1,273,232 $m^2$ (1.273232) $km^2$, which exceeds a typical sized pixel aggregation for a Low Earth Observing (LEO) satellite (which pixel aggregation is typically about 1 $km^2$).

As noted, in some examples, the calibration target 54 can be deployed in a body of water. The body of water can be, for example, an ocean, sea or lake. In other examples, the calibration target 54 can be deployed on land.

The image sensor 52 can capture/sample a portion of the light rays 62, 64 and 66 emitted by the K number of bulbs 56 of the calibration target 54. As noted, the light output by the calibration target 54 (indicated by the light rays 62, 64 and 66) can have sufficient luminance (e.g., brightness) to saturate at least one pixel of the image sensor 52. Moreover, since the wavelengths and frequencies radiated from the K number of bulbs 56 are predetermined and can be programmed into the image sensor 52, the image sensor 52 can be calibrated. The calibration of the image sensor 52 can compensate for errors/drift caused by environmental conditions (e.g., temperature), atmospheric variables (e.g., airborne dust, water zone vapor, etc.) and/or atmospheric attenuations.

In some examples, the image sensor 52 can include a plurality of sub-image sensors that each detects a different, single, spectral band of light. For instance, in such a situation, the image sensor 52 could include 3 sub-image sensors that detect red, blue and green light, respectively. In this situation, during a calibration procedure, the output of the K number of bulbs 56 can be changed periodically and/or asynchronously to fine tune calibration of each of the plurality of sub-image sensors of the image sensor 52.

In one example, during a calibration procedure, the remote controller 70 can cause each of the K number of bulbs 56 (or some subset thereof) to output a solid color in a particular spectral band to be detected by a particular sub-image sensor of the image sensor 52. For example, the K number of bulbs 56 can output a red color and the sub-image sensor of the image sensor 52 that detects red can be calibrated, which sub-image sensor can be referred to as a red sub-image sensor. Additionally, in this situation, the remote controller 70 can cause the K number bulbs 56 (or a subset thereof) to output a blue color for the red sub-image sensor of the image sensor 52. During this portion of the calibration, the amount of blue light detected by the red sub-image sensor can be measured to determine an amount of "cross talk" corresponding to an unwanted transfer signal detected by the red sub-image sensor.

Additionally or alternatively, the remote controller 70 can cause different K number of bulbs 56 to output different solid colors. For example, the remote controller 70 can cause a first set of the K number of bulbs 56 to output a red color, a second set of the K number of bulbs 56 to output a blue color and a third set of the K number of bulbs 56 to output a green color. In such a situation, the light rays 62, 64 and 66 can represent different colors. In situations where the light rays 62, 64 and 66 are different colors, the image sensor 52 can detect the output of the calibration target 54 as a single color since the colors aggregate, integrate and combine over the distance D between the image sensor 52 and the calibration target 54 similarly to natural and desired targets on the earth's surface of interest to the image sensor 52. Establishing a known source gives insight into the validation of real targets needed by mission objectives.

Additionally or alternatively, the intensity of light output by the K number of bulbs 56 (or some subset thereof) can be varied to change the color observed by the image sensor 52. By combining a variance in intensity and color (wavelength) of light output by the K number of bulbs 56, nearly any color can be output by the calibration target 54. Accordingly, the calibration target 54 can be employed to calibrate the image sensor 52 in situations where the image sensor 52 employs a large spectrum of detectable bands, such as a hyperspectral image sensor.

In other examples, the calibration target 54 can be employed in a plant functional typing procedure for aquatic life. Each species of phytoplankton absorbs and transmits different light waves. Accordingly, the remote controller 70 can control the output of the K number of bulbs 56, which can cause the K number of bulbs 56 (or some subset thereof) to output light at a predetermined wavelength, which can be shined through/on phytoplankton of a specific species similar to artificially controlling the bottom surface type. In such a situation, the image sensor 52 can detect and measure the amount of light and the wavelength of the light transmitted by the bulbs 56 and through the phytoplankton. This measurement can be employed (e.g., by the remote controller 70 or another computing device) to determine the species of the phytoplankton, as well as the density of the phytoplankton in the water.

Additionally, to facilitate the plant functional typing, in some examples, fewer layers of the K number of bulbs 56 can be deployed to allow some water to rest between, above and/or below some of the K number of bulbs. In this manner a portion of the light rays 62, 64 and 66 can be shined through water to allow for the functional typing.

In examples where the calibration target 54 is deployed in water, the container 58 and the K number of bulbs 56 can be easily deployed and/or retracted in a remote location (e.g., by a boat, such as a fishing vessel) that is away from artificial sources of light (e.g., cities) to maintain a dark background to increase the contrast between the calibration target 54 and the body of water in which the calibration target 54 is deployed. For instance, to deploy the calibration target 54, a boat can deploy the container 58 (a seine net) and then deploy the K number of bulbs, thereby reducing the need for specialized equipment. Moreover, in some examples the calibration target 54 can be deployed in a temporary manner (e.g., 1-2 days). In other examples (e.g., in a terrestrial deployment), the calibration target 54 can be deployed in a permanent/semi-permanent manner, and only minimal and infrequent maintenance, such as battery recharging/changing and/or anti-biofouling techniques may be needed.

Figure 3:
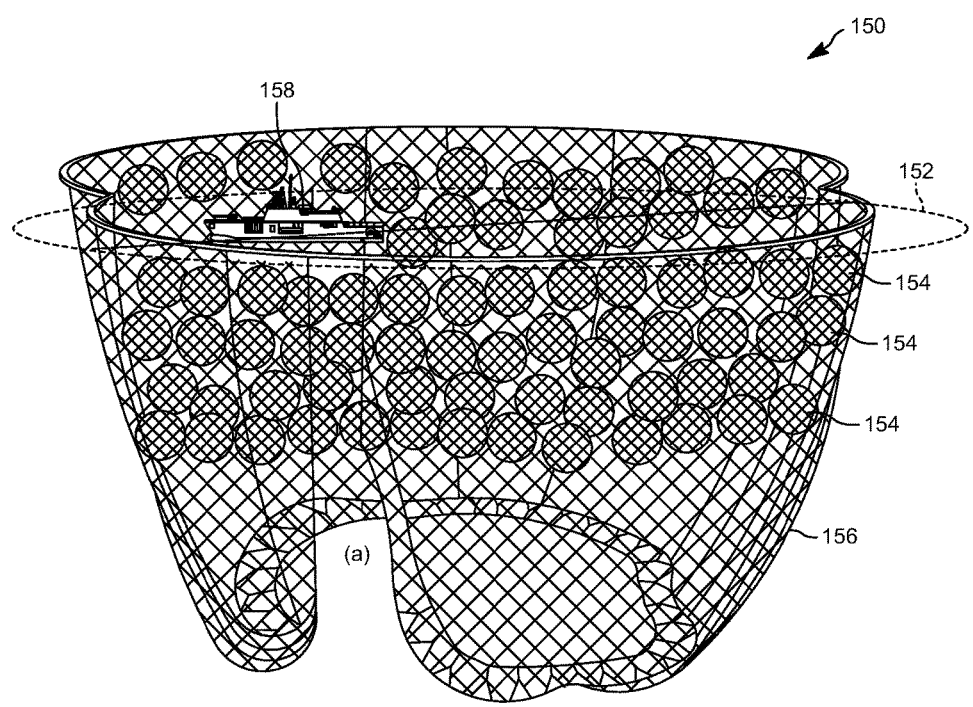
FIG. 3 illustrates an example of a calibration target for an image sensor.

FIG. 3 illustrates an example of a calibration target 150 that can be employed, for example, to implement the calibration target 54 of FIG. 1. The calibration target 150 can be floating in a body of water represented as dashed line 152. The body of water 152 can be, for example, an ocean, a sea, a lake, etc.

The calibration target 150 can include K number of bulbs 154 disposed within a seine net 156. The seine net 156 can be employed to implement the container 58 illustrated in FIG. 1. Moreover, each of the K number of bulbs 154 can be implemented in a manner similar to the bulb 100 illustrated in FIG. 2. For purposes of simplification of explanation, only some of the bulbs 154 are labeled with reference numbers in FIG. 3. However, it is to be understood that other bulbs 154 can be implemented in a similar manner. An output of the K number of bulbs 154 can be controlled by an external system (e.g., the remote controller 70 of FIG. 1). In this manner, the light emitted by the K number of bulbs can be controlled to calibrate an image sensor (e.g., the image sensor 52 of FIG. 1).

The seine net 156 can circumscribe the K number of bulbs 154 to partially enclose a volume (e.g., open top). The seine net 156 can be nearly any depth that is needed/desired. Moreover, the seine net 156 can be implemented as a purse seine net with a plurality of rings and can be nearly any depth that is needed/desired. In such a situation, the seine net 156 can include a purse line passing through the rings that can apply tension and draw the K number of bulbs 154 toward each other. In this manner, the density of the K number of bulbs within the body of water 152 can be controlled.

The bulb 100 can be easily deployed by a boat 158 in a remote location that is away from artificial sources of light to maintain a high contrast between the body of water 152 and the calibration target 150.

Furthermore, individual pieces (e.g., the K number of bulbs 154) of the calibration target 150 can be deployed and/or retracted over a time period. In this manner, the need for specialized equipment to deploy or retract the calibration target 150 can be reduced. For example, the boat 158 can be a commercial fishing vessel that includes equipment to deploy and retract the seine net 156. Furthermore, the boat 158 can include a compartment designed for holding fish that can be employed to hold the K number of bulbs 154 (or some portion thereof). Moreover, due to the simplicity of the design of the calibration target, only minimal and infrequent maintenance, such as battery recharging/changing and/or anti-biofouling techniques may be needed.

Figure 4:
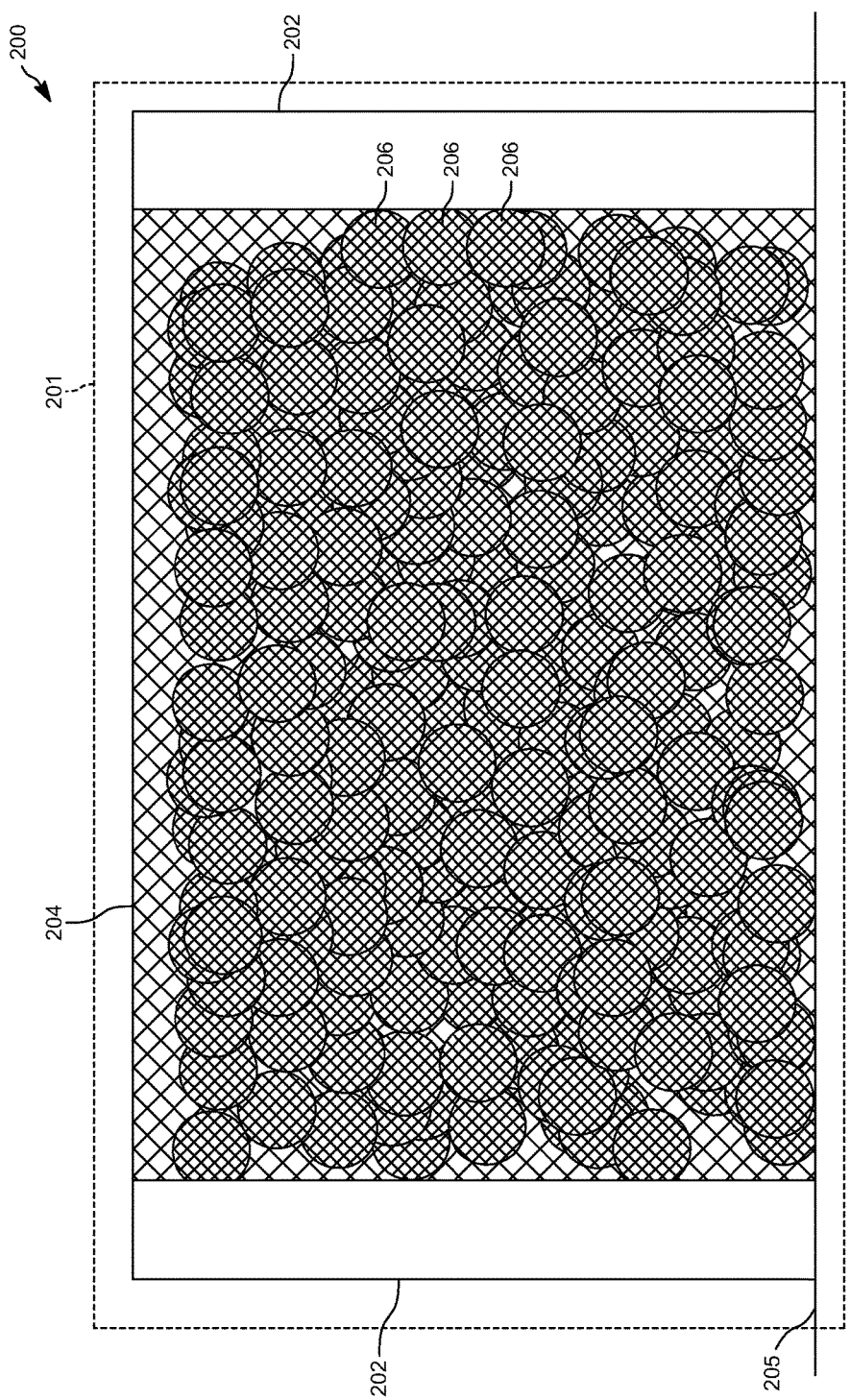
FIG. 4 illustrates a side view of a calibration target for an image sensor.
Figure 5:
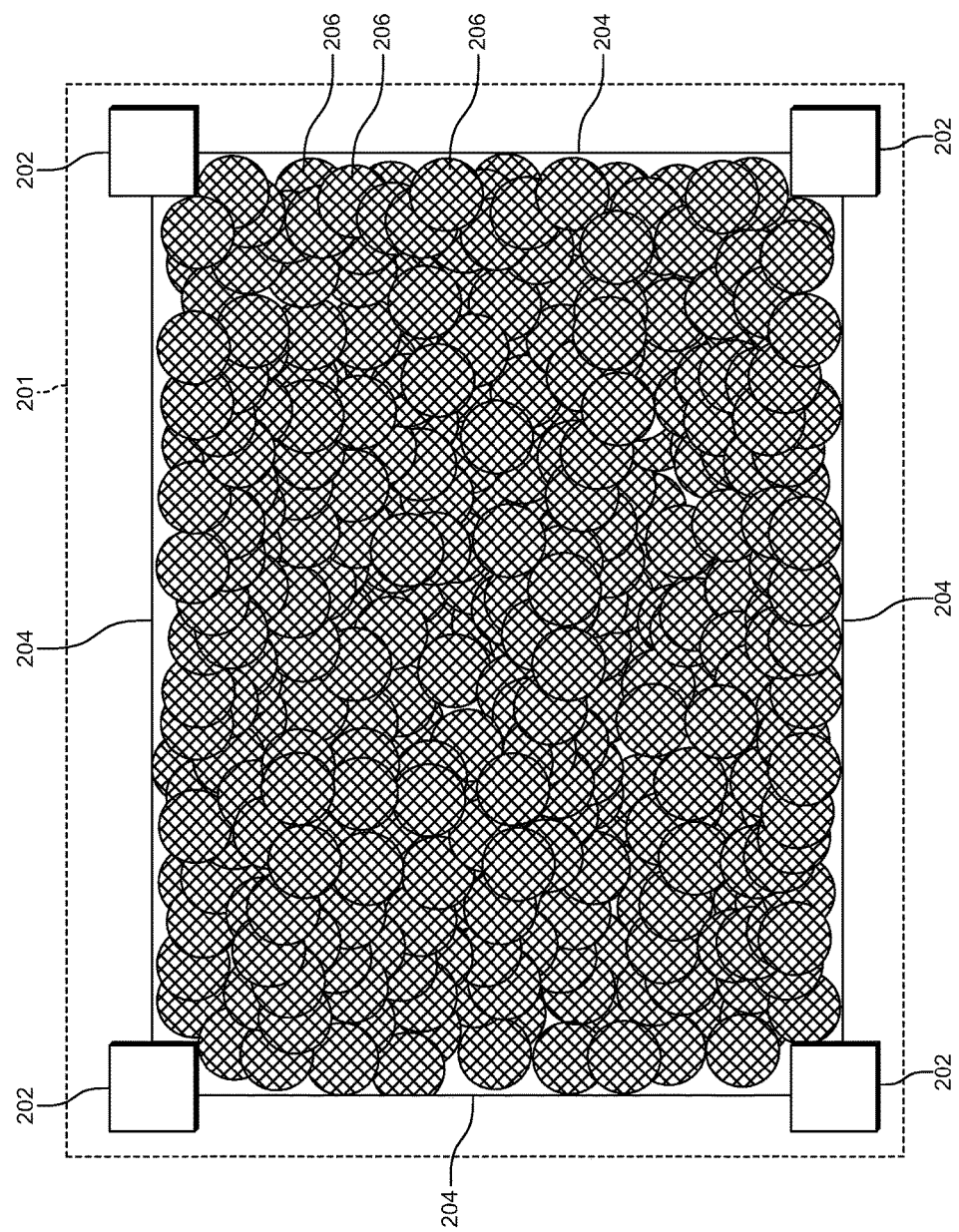
FIG. 5 illustrates a top view of a calibration target for an image sensor.

FIG. 4 illustrates a side view of an example of a calibration target 200 that can be employed, for example, to implement the calibration target 54 of FIG. 1. The calibration target 200 can be deployed in a terrestrial location, such as a desert, plains or other relatively flat natural surface. FIG. 5 illustrates an overhead view of the calibration target 200. For purposes of simplification of explanation, FIGS. 4 and 5 employ the same reference numbers to denote the same structure.

The calibration target 200 can include a container 201 (e.g., a holding structure) that partially encloses a volume (e.g., open top). The container 201 can be formed with a plurality of posts 202 and a barrier 204 extending between the posts 202 that are affixed to the ground, which is indicated as reference number 205. In some examples, the barrier 204 can be formed of individual segments connected between the posts 202. In other examples, the barrier 204 can be continuous. In some examples, the barrier 204 can be a fence, a net, etc. In other examples, the barrier 204 can be a solid structure, such as glass, plastic or metal. In the example illustrated in FIG. 5, there are 4 posts 202 visible to form a rectangle, but in other examples, more or less posts 202 can be employed. For instance, in other examples, posts (when connected by the barrier 204) can form a triangle, a hexagon, an octagon, etc.

The calibration target 200 includes K number of bulbs 206. Each of the K number of bulbs 206 can be implemented in a manner similar to the bulb 100 illustrated in FIG. 2. For purposes of simplification of explanation, only some of the bulbs 206 are labeled with reference numbers in FIGS. 4 and 5. However, it is to be understood that other bulbs 206 can be implemented in a similar manner. An output of the K number of bulbs 206 can be controlled by an external system (e.g., the remote controller 70 of FIG. 1). In this manner, the light emitted by the K number of bulbs can be controlled to calibrate an image sensor (e.g., the image sensor 52 of FIG. 1).

The K number of bulbs 206 can be contained within the container 201, particularly by the barrier 204. The container 201 can be formed to nearly any height that is needed/desired. The bulbs 206 can be stacked within the container 201 to achieve a specific optical result. The calibration target 200 can be easily deployed in a remote location that is away from artificial sources of light (e.g., cities) to maintain a high contrast between the calibration target 150 and the terrestrial area around the calibration target.

Furthermore, individual pieces (e.g., the K number of bulbs 154) of the calibration target 200 can be deployed and/or retracted over a time period. Moreover, due to the simplicity of the design of the calibration target 200, only minimal and infrequent maintenance, such as battery recharging/changing may be needed. Accordingly, the calibration target 200 may be employed in situations where a permanent or semi-permanent deployment of the calibration target 200 is desired.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A calibration target for an image sensor comprising:
   a plurality of bulbs that each emit light at one or more predetermined wavelengths; and
   a container circumscribing the plurality of bulbs, wherein the plurality of bulbs are stacked and scattered within a volume partially or fully enclosed by the container, wherein the container has an open top that defines an area of the calibration target, wherein the container comprises a purse seine net that has a plurality of rings; wherein the image sensor is deployed on an aircraft or a satellite.

2. The calibration target of claim 1, wherein the purse seine comprises:

a purse line passing through the plurality of rings to apply tension on the plurality of bulbs to draw the plurality of bulbs toward each other.

3. The calibration target of claim 1, wherein the purse seine net and the plurality of bulbs are buoyant, wherein the calibration target is deployed in a body of water.

4. The calibration target of claim 3, wherein there are at least 6 layers of bulbs within the purse seine.

5. The calibration target of claim 3, wherein there are 4 or less layers of bulbs within the purse seine, and at least some portion of the body of water is viewable from a top view of the calibration target.

6. The calibration target of claim 1, wherein each of the plurality of bulbs comprises:
a plurality of light emitting devices;
an antenna that receives wireless signals communicated from a remote controller; and
a controller configured to control an output of the light emitting device based on the wireless signals received from the remote controller.

7. The calibration target of claim 6, wherein each of the plurality of light emitting device devices comprises a light emitting diode (LED).

8. A calibration target for an image sensor comprising:
a plurality of bulbs that each emit light at one or more predetermined wavelengths; and
a container circumscribing the plurality of bulbs, wherein the plurality of bulbs are stacked and scattered within a volume partially or fully enclosed by the container, wherein the container has an open top that defines an area of the calibration target, wherein the container comprises:
a plurality of posts; and
a barrier extending between the plurality of posts;
wherein the image sensor is deployed on an aircraft or a satellite.

9. The calibration target of claim 8, wherein the barrier comprises a fence.

10. The calibration target of claim 8, wherein the barrier comprises a net.

11. The calibration target of claim 1, wherein the area of the open top of the container is at least 25 square meters.

12. The calibration target of claim 1, wherein the plurality of bulbs output light sufficient to saturate at least one pixel of an image sensor deployed on a satellite.

13. The calibration target of claim 12, wherein the area of the open top of the container is at least 62,500 square meters.

14. The calibration target of claim 1, wherein at least two of the plurality of bulbs emits light at a different intensity and a different color.

15. A calibration target for an image sensor comprising:
a plurality of buoyant bulbs, wherein each of the plurality of buoyant bulbs comprises:
a plurality of light emitting devices;
an antenna that receives wireless signals communicated from a remote controller;
a controller configured to control an output of the light emitting device based on the wireless signals received from the remote controller; and
a seine net circumscribing the plurality of buoyant bulbs;
wherein the calibration target is deployed in a body of water, and the image sensor is deployed on one of an aircraft and a satellite.

16. The calibration target of claim 15, wherein the plurality of light sources of each of the plurality of buoyant bulbs comprises a light emitting diode.

17. The calibration target of claim 15, wherein the plurality of buoyant bulbs output light sufficient to saturate at least one pixel of the image sensor.

18. A calibration target for an image sensor comprising:
a seine net circumscribing an area in a body of water; and
a plurality of bulbs that each emit light at one or more predetermined wavelengths, wherein the plurality of bulbs are stacked and scattered within a volume partially or fully enclosed by the container, wherein at least two of the plurality of bulbs emit different color light.

19. The calibration target of claim 18, wherein the plurality of floatation devices output light sufficient to saturate at least one pixel of the image sensor.

\* \* \* \* \*